Nov. 3, 1942.  W. R. WILEY  2,300,478
CLIP
Filed Sept. 25, 1939
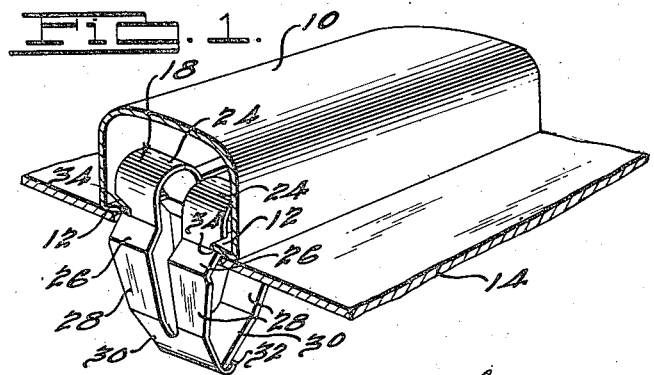
INVENTOR
William R. Wiley.
BY
Harness, Dickey & Pierce.
ATTORNEYS.

Patented Nov. 3, 1942

2,300,478

UNITED STATES PATENT OFFICE 2,300,478

CLIP

William R. Wiley, Birmingham, Mich.

Application September 25, 1939, Serial No. 296,331

2 Claims. (Cl. 189—88)

The present invention relates to improved clip constructions of the type particularly adapted for securing trim molding to panel members, such as automobile body panels.

One of the primary objects of the present invention is to provide improved clip constructions of the type mentioned which may be used equally well with a variety of shaped moldings, such as moldings which have irregularly shaped cross sections of variable height, or moldings which are relatively shallow, or moldings which are relatively deep.

Another object of the invention is to provide improved molding clips of the type mentioned having resiliently acting means for engaging a molding and resiliently acting means engaging a panel in which the forces of the respective means act at substantially right angles to each other.

Another object of the invention is to provide improved clips of the type mentioned in which the portions thereof which engage the molding extend within the aperture in the panel to which the molding is applied, such aperture being enlarged transversely of the molding to permit such extension.

A further object of the invention is to provide improved clip constructions which are economical to manufacture, readily installed, and secure in their action.

Other objects of the invention will become apparent from the following specification, the drawing relating thereto, and from the claims hereinafter set forth.

In the drawing, in which like numerals are used to designate like parts in the several views throughout:

Figure 1 is a fragmentary, perspective view of a sheet metal molding strip attached to a panel by an improved clip construction according to the present invention;

Fig. 2 is a fragmentary, top plan view with parts broken away of the structure shown in Fig. 1;

Fig. 3 is a cross-sectional view taken substantially along the line 3—3 of Fig. 2;

Fig. 4 is a cross-sectional view taken substantially along the line 4—4 of Fig. 3;

Fig. 5 is a perspective view of the clip illustrated in Figs. 1 to 4;

Fig. 6 is a view similar to the view in Fig. 1, illustrating a modified form of clip construction; and another form of molding;

Fig. 7 is a top plan view with parts broken away of the structure illustrated in Fig. 6;

Fig. 8 is a cross-sectional view taken substantially along the line 8—8 of Fig. 6;

Fig. 9 is a cross-sectional view taken substantially along the line 9—9 of Fig. 8; and, Fig. 10 is a perspective view of the clip illustrated in Figs. 6 to 9.

Referring to the drawing, and referring particularly to Figs. 1 through 5 thereof, a sheet metal channel shaped molding strip 10 is illustrated having inturned flanges 12 which are preferably bent slightly upwardly. The strip 10 is elongated in form and is adapted to be attached to a sheet metal panel 14, such as one of the body panels of an automobile, at spaced intervals along its length. The panel 14 is provided with a plurality of spaced openings or apertures 16 which, in the embodiment illustrated, are rectangular in form and which are of a greater width transversely of the molding than lengthwise thereof. The apertures 16, transversely of the moldings, are of such a width that the edges thereof are overlapped by the flanges 12 of the molding 10.

The molding 10 is adapted to be secured to the panel 14 by means of clips, generally indicated at 18, which engage the molding strip 10 and engage the panel 14 through the openings or apertures 16. The clip 18 comprises a hardened and tempered sheet metal strip formed to provide a pair of similar holding and panel engaging portions in the form of arms or elements generally indicated at 20 and 22 which are positioned side by side and are integral with the single sheet from which the clips are formed.

The arms 20 and 22 are similar in shape and are formed by providing an opening or space through the sheet metal strip substantially throughout its length. The clip is formed by bending it intermediate its ends, thereby providing arched head portions 24 which have substantially straight sides. The straight sides join outwardly and downwardly diverging portions 26 which form tapered shoulders adapted to engage the opposite long edges of the aperture 16 when the clip is positioned therein. The next adjacent portions 28 converge toward the ends of the clip and join end portions 30 which converge at a sharper angle toward each other.

The opening which separates the arms or elements 20 and 22 extends to within the end portions 30, and such end portions are continuous across the lower edges thereof so that the arms 20 and 22 are integral.

The end portions 28 and 30 provide a resilient prong adapted for insertion in the aperture 16 of the panel 14. The end portions 30 meet at the lowermost point of the clip, and one of such end portions is longer than the other and is bent over the plane end of the other as indicated at 32, as in the structure described in United States Letters Patent to William R. Wiley, No. 2,084,717, patented June 22, 1937.

The opening which separates arms 20 and 22 is of such a character that such arms are resiliently movable toward and away from each other. The outer edges of such arms are provided with notch shaped portions 34, the upper edges of which are tapered downwardly and inwardly, as indicated at 26. The notches 34 are adapted to receive therein the inturned lateral edges of the flanges 12 on the molding 10 when the molding 10 is positioned against the panel 14. The cam edges 36 of the notches serve to resiliently urge the flanges 12 down against the panel, due to the inherent resiliency of the arms 20 and 22 which thrust outwardly against the edges of the flanges 12.

The shoulder portions 26 bear against the under edges of the aperture 16 and the action of such shoulders is resiliently outwardly, the same as the corresponding panel engaging shoulders disclosed in the Wiley patent above mentioned.

It will thus be seen that the flanges 12 project inwardly beyond the edges of the aperture 16 on the short sides thereof, and that the notches 34 are at a level closely adjacent the level of the engaging portions of the shoulders 26. The shoulders 26 engage the long sides of the aperture 16 and the forces exerted by such shoulders are in directions substantially at right angles to the direction of the resilient forces exerted by the notched edges 34 of arms 20 and 22. The molding 10 is thus securely and snugly held against the panel 14 by the action of the clip 18.

Referring to Figs. 6 to 10, another form of construction is illustrated, embodying features of the present invention. In this embodiment of the invention, a shallow molding 40 is illustrated which is generally similar to the mold 10 above described, and which is provided with inturned flanges 42 extending throughout the length of the molding. The panel 14 is provided with an aperture 44 therein which is of greatest length transversely of the molding 40.

In this embodiment of the invention, a clip generally indicated at 46, is provided which is formed of a hardened and tempered steel strip. The clip 46 comprises a generally rectangular base portion 48 having integral, resilient arms 50 and 52 extending in the same directions, or on the same side of the base from the edges of the base 48. The arms are arranged in oppositely disposed pairs, that is, the arms 50 constitute one of the pairs, and the arms 52 constitute the other of the pairs. The arms 50 and 52 are resilient and are independently and resiliently movable with respect to each other.

The arms 50 are provided with a slight radius 56 adjacent the juncture of such arms with the base 48 and then continue in an inwardly bowed portion 58. The outer ends of the arms are then inclined inwardly and upwardly as indicated at 60 and are joined to portions 58 by a slight radius 62. The arms 50 are of reduced section transversely thereof, providing necked-in portions, indicated at 67. With this construction, considerable force is exerted by the shoulder portion 60 against the panel 14.

The portions 60 form shoulder portions which are adapted to engage opposite edges of the aperture 44 in the panel 14 in order to secure the molding thereto in a manner that will thus become more apparent from the following description.

The arms 52 form the molding engaging means and such arms are preferably, generally flat. The upper ends thereof are bent outwardly, as indicated at 64; tabs 66 are struck out of the arms 52 adjacent each of the side edges thereof and are bent downwardly and outwardly so that they cooperate with the portions 64 to form V-shaped notches, or V-shaped engaging portions 68. Such V-shaped portions are adapted to receive therein the edges of the inturned flanges 42 and the undersurface of the portions 64 form cam edges which, due to the forces exerted by arms 52, force the molding 40 downwardly against the panel 14 in snug relationship therewith.

The inturned flanges 42 extend inwardly beyond the short side edges of the aperture 44. Such short edges are preferably of slightly greater width than the width of the molding engaging portions of the arms 52 so that when the arms 52 engage the molding the clips are prevented from turning within the apertures 44.

The arms 50 and 52 terminate at substantially the same level and both extend through the aperture 44. The portions 64 of arms 52 lie on one side of the panel and the portions 66 lie on the other side of the panel. The shoulder portions 60 are resiliently urged against the under edge of the panel 14 adjacent the long sides of the aperture; and the force exerted by the arms 52 against the panel is in a resultant downward direction so that the molding 40 is urged tightly against the panel 14.

By this construction, it will be seen that a relatively shallow molding may be secured to a panel, in that a very small portion of the clip projects within the molding.

Formal changes may be made in the specific embodiments of the invention described without departing from the spirit and substance of the broad invention, the scope of which is commensurate with the appended claims.

What is claimed is:

1. In combination, a generally channel shaped molding strip having inturned flanges at its lateral edges, a sheet metal panel having an aperture therein, said aperture being of greater width transversely of said molding than longitudinally thereof, and a clip for securing said molding strip to said panel, said clip comprising a sheet metal strip formed to provide a base, a plurality of resilient elements extending from said base in the same direction, said elements being arranged in oppositely disposed pairs, the elements of one of said pairs terminating in inwardly sloping surfaces which resiliently engage opposite edges of said aperture, and the elements of another of said pairs terminating in outwardly disposed notch shaped portions which engage said inturned flanges, said notch shaped portions extending through said aperture on both sides of said panel.

2. In combination, a generally channel-shaped molding strip having inturned flanges at its lateral edges, a sheet metal panel having an aperture therein, said aperture being of greater width transversely of said molding than longitudinally thereof, said inturned flanges extending inwardly beyond the short edges of said aperture when said molding is applied to said panel, and a clip for securing said molding strip to said panel, said clip comprising a sheet metal strip formed to provide a substantially rectangular base, resilient arms integral with said base along the sides thereof, said arms being independently resilient with respect to each other and being arranged in oppositely disposed pairs, the elements of one of said pairs terminating in inwardly sloping shoulder portions which bear against the long side edges of said aperture, and the elements of the other of said pairs terminating in outwardly disposed notch shaped portions, the edges of said inturned flanges being received within said notch shaped portions and said notch shaped portions extending through said aperture with the ends thereof on opposite sides of said panel.

WILLIAM R. WILEY.